US011227103B2

(12) United States Patent
Wang et al.

(10) Patent No.: US 11,227,103 B2
(45) Date of Patent: Jan. 18, 2022

(54) IDENTIFICATION OF PROBLEMATIC WEBFORM INPUT FIELDS

(71) Applicant: International Business Machines Corporation, Armonk, NY (US)

(72) Inventors: Tuo Wang, North York (CA); Lior Aronovich, Thornhill (CA); Ziyue Jason Wang, North York (CA); Yu-Ching Chen, North York (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/674,962

(22) Filed: Nov. 5, 2019

(65) Prior Publication Data
US 2021/0133281 A1 May 6, 2021

(51) Int. Cl.
*G06F 17/00* (2019.01)
*G06F 40/174* (2020.01)
*G06F 8/70* (2018.01)
*G06F 9/455* (2018.01)

(52) U.S. Cl.
CPC .............. *G06F 40/174* (2020.01); *G06F 8/70* (2013.01); *G06F 9/455* (2013.01)

(58) Field of Classification Search
CPC ........ G06F 40/174; G06F 9/455; G06F 3/041; G06F 3/0233; G06N 3/04; G06N 3/08; G06N 3/0454; G06N 3/0481; G06Q 20/4016; G06Q 20/202
USPC ........................................................ 715/224
See application file for complete search history.

(56) References Cited

U.S. PATENT DOCUMENTS

| 6,311,180 | B1 * | 10/2001 | Fogarty ............... G06F 16/9577 707/749 |
| 8,619,095 | B2 | 12/2013 | Jaramillo et al. |
| 9,256,784 | B1 | 2/2016 | Taylor et al. |
| 9,563,271 | B1 | 2/2017 | Ben-Yair et al. |
| 9,658,690 | B2 | 5/2017 | Ben-Yair et al. |

(Continued)

FOREIGN PATENT DOCUMENTS

WO 2014052891 A1 4/2014

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Jason T Edwards
(74) *Attorney, Agent, or Firm* — Kelli D. Morin

(57) ABSTRACT

Provided is a method for identifying problematic input fields in a webform. The method comprises obtaining a set of user interaction data for a plurality of user interactions with input fields of a webform. The user interaction data for each input field includes data corresponding to at least one aspect. The method comprises assigning an aspect value to each aspect of each user interaction with each input field. The method comprises aggregating aspect values into an aggregated aspect value for each input field, generating a score for each input field based at least in part on the aggregated aspect field, ranking the input fields by their respective scores to identify at least one particular input field in the webform as problematic, and indicating that the at least one particular input field in the webform is problematic.

17 Claims, 11 Drawing Sheets

(56) References Cited

U.S. PATENT DOCUMENTS

| | | | |
|---|---|---|---|
| 9,658,691 | B2 | 5/2017 | Ben-Yair et al. |
| 9,746,920 | B2 | 8/2017 | Ben-Yair et al. |
| 2003/0028792 | A1 | 2/2003 | Plow et al. |
| 2005/0216278 | A1* | 9/2005 | Eisen ................. G06Q 20/4016 705/35 |
| 2009/0228233 | A1* | 9/2009 | Anderson ............. G06Q 10/10 702/127 |
| 2011/0201387 | A1 | 8/2011 | Paek et al. |
| 2012/0106793 | A1 | 5/2012 | Gershenson et al. |
| 2013/0097480 | A1 | 4/2013 | Allison et al. |
| 2013/0106793 | A1 | 5/2013 | Lai |
| 2013/0145304 | A1 | 6/2013 | DeLuca et al. |
| 2013/0235073 | A1 | 9/2013 | Jaramillo et al. |
| 2014/0310256 | A1 | 10/2014 | Olsson et al. |
| 2014/0361996 | A1 | 12/2014 | Eden et al. |
| 2015/0039622 | A1 | 2/2015 | Sampath-Kumar et al. |
| 2015/0092929 | A1* | 4/2015 | Blanchard ........... H04M 3/4936 379/88.01 |
| 2015/0154617 | A1 | 6/2015 | DiPietro et al. |
| 2015/0262130 | A1* | 9/2015 | Taylor ............... G06F 16/24578 705/321 |
| 2016/0124930 | A1 | 5/2016 | Dhawan et al. |
| 2016/0147828 | A1* | 5/2016 | Yu ....................... G06F 16/3329 705/31 |
| 2017/0060236 | A1 | 3/2017 | Ben-Yair et al. |
| 2017/0357977 | A1* | 12/2017 | Pitz ........................ G06Q 20/32 |
| 2018/0115899 | A1* | 4/2018 | Kedem ................ G06F 21/554 |
| 2019/0108439 | A1* | 4/2019 | Lu ........................ G06N 3/0454 |

OTHER PUBLICATIONS

Arieli et al.; "Tracking fairness considerations and choice procedures"; pp. 1-20.

Bojko et al.; "Eye Tracking and Usability Testing in Form Layout Evaluation"; BFMA; Proceedings of the 39th International Symposium of Business Forms Management Association (BFMA); pp. 1-13.

List of IBM Patents or Patent Applications Treated as Related, Dec. 18, 2020, 2 pgs.

Majaranta, Paivi; "Gaze Interaction and Applications of Eye Tracking: Advances in Assistive Technologies"; Medical Information Science Reference; 2012; 398 pages.

Tan et al.; "Error Recovery in a Blended Style Eye Gaze and Speech Interface"; ICMI' 03; Nov. 5-7, 2003; Vancouver, British Columbia, Canada; Copyright © 2003, ACM; pp. 196-202.

* cited by examiner

300

304 NAME:

308 SEX: ○ MALE ○ FEMALE

312 AGE: ▼ 18

316 EXPERIENCE:

320 SUBMIT

| Field ID | Input Field | Previous ID |
|---|---|---|
| 1 | NAME | |
| 2 | SEX | |
| 3 | AGE | |
| 4 | EXPERIENCE | |

| Field ID | Input Field | Previous ID |
|---|---|---|
| 6 | FULL NAME | 1 |
| 2 | SEX | |
| 3 | AGE | |
| 7 | PREVIOUS RELATED EXPERIENCE | 4 |

| Entry ID | Field ID | Waiting | Changing | Invalid | Copying | Exiting |
|---|---|---|---|---|---|---|
| 1 | 1 | 10 | 3 | 2 | 0 | 0 |
| 1 | 2 | N/A | N/A | N/A | N/A | N/A |
| 1 | 3 | 1 | 1 | 0 | 0 | 0 |
| 1 | 4 | 20 | 4 | 0 | 0 | 0 |
| 2 | 1 | 4 | 1 | 0 | 0 | 0 |
| 2 | 2 | 80 | 1 | 0 | 0 | 0 |
| 2 | 3 | 1 | 1 | 0 | 0 | 0 |
| 2 | 4 | 10 | 4 | 0 | 0 | 0 |
| 3 | 1 | 6 | 2 | 1 | 0 | 0 |
| 3 | 2 | 4 | 2 | 0 | 0 | 0 |
| 3 | 3 | 4 | 1 | 0 | 0 | 0 |
| 3 | 4 | 30 | 4 | 0 | 1 | 1 |
| 4 | 1 | 2 | 1 | 0 | 0 | 0 |
| 4 | 2 | 10 | 1 | 0 | 0 | 0 |
| 4 | 3 | 4 | 1 | 0 | 0 | 0 |
| 4 | 4 | 20 | 6 | 0 | 1 | 0 |

| Waiting | Changing | Invalid | Copying | Exiting |
|---|---|---|---|---|
| 10 | 3 | 2 | 0 | 0 |
| 4 | 1 | 0 | 0 | 0 |
| 6 | 2 | 1 | 0 | 0 |
| 2 | 1 | 0 | 0 | 0 |
| 38 | 7 | 3 | 0 | 0 |
| 38÷4 user interactions = 9.5 | 7÷4 user interactions = 1.75 | 3÷4 user interactions = 0.75 | 0÷4 user interactions = 0 | 0÷4 user interactions = 0 |

| Waiting | Changing | Invalid | Copying | Exiting |
|---|---|---|---|---|
| 80 | 1 | 0 | 0 | 0 |
| 4 | 2 | 0 | 0 | 0 |
| 10 | 1 | 0 | 0 | 0 |
| 94 | 4 | 0 | 0 | 0 |
| 94÷3 user interactions = 31.3 | 4÷3 user interactions = 1.3 | 0÷3 user interactions = 0 | 0÷3 user interactions = 0 | 0÷3 user interactions = 0 |

| Waiting | Changing | Invalid | Copying | Exiting |
|---|---|---|---|---|
| 1 | 1 | 0 | 0 | 0 |
| 1 | 1 | 0 | 0 | 0 |
| 4 | 1 | 0 | 0 | 0 |
| 4 | 1 | 0 | 0 | 0 |
| 10 | 4 | 0 | 0 | 0 |
| 10÷4 user interactions = 2.5 | 4÷4 user interactions = 1.0 | 0÷4 user interactions = 0 | 0÷4 user interactions = 0 | 0÷4 user interactions = 0 |

| Waiting | Changing | Invalid | Copying | Exiting |
|---|---|---|---|---|
| 20 | 4 | 0 | 0 | 0 |
| 10 | 4 | 0 | 0 | 0 |
| 30 | 4 | 0 | 1 | 1 |
| 20 | 6 | 0 | 1 | 0 |
| 80 | 18 | 0 | 2 | 1 |
| 80÷4 user interactions = 20 | 18÷4 user interactions = 4.5 | 0÷4 user interactions = 0 | 2÷4 user interactions = 0.5 | 1÷4 user interactions = 0.25 |

| | Field 1 | Field 2 | Field 3 | Field 4 |
|---|---|---|---|---|
| Waiting | 3 | 1 | 4 | 2 |
| Changing | 2 | 3 | 4 | 1 |
| Invalid | 1 | 2 | 2 | 2 |
| Copying | 2 | 2 | 2 | 1 |
| Exiting | 2 | 2 | 2 | 1 |

| | Field 1 | Field 2 | Field 3 | Field 4 |
|---|---|---|---|---|
| Waiting = 1.0 | (4-3)×1.0=1.0 | (4-1)×1.0=3.0 | (4-4)×1.0=0.0 | (4-2)×1.0=2.0 |
| Changing = 1.4 | (4-2)×1.4=2.8 | (4-3)×1.4=1.4 | (4-4)×1.4=0.0 | (4-1)×1.4=4.2 |
| Invalid = 1.2 | (4-1)×1.2=3.6 | (4-2)×1.2=2.4 | (4-2)×1.2=2.4 | (4-2)×1.2=2.4 |
| Copying = 1.6 | (4-2)×1.6=3.2 | (4-2)×1.6=3.2 | (4-2)×1.6=3.2 | (4-1)×1.6=4.8 |
| Exiting = 2.0 | (4-2)×2.0=4.0 | (4-2)×2.0=4.0 | (4-2)×2.0=4.0 | (4-1)×2.0=6.0 |
| | 14.6 | 14.0 | 9.6 | 19.4 |

801 → (header row)
802 → (totals row)

| Field | Score | Ranking |
|---|---|---|
| 1 | 14.6 | 2 |
| 2 | 14.0 | 3 |
| 3 | 9.6 | 4 (least problematic) |
| 4 | 19.4 | 1 (most problematic) |

| | |
|---|---|
| Most problematic input field: | 4 |
| Second most problematic input field: | 1 |
| Third most problematic input field: | 2 |
| Least problematic input field: | 3 |

FIG. 10

IDENTIFICATION OF PROBLEMATIC WEBFORM INPUT FIELDS

BACKGROUND

The present disclosure relates generally to the field of webforms, and more particularly to identification of problematic input fields in a webform.

A webform is an interactive form on a website that allows a user to enter data into one or more input fields. The data entered into the input field(s) is collected by the webform and sent to a server for processing. To promote intuitive interaction by users, a webform can resemble a paper form, including input fields that resemble checkboxes and text fields. Like paper forms, webforms may have some input fields that are easier for users to complete and some input fields that are more difficult for users to complete.

SUMMARY

Embodiments of the present disclosure include a method, computer program product, and system for identifying problematic input fields in a webform. The method comprises obtaining a set of user interaction data for a plurality of user interactions with input fields of a webform, wherein the user interaction data for each input field includes data corresponding to at least one aspect. The method comprises assigning a respective aspect value to each aspect of each user interaction with each input field. The method comprises aggregating the aspect values into an aggregated aspect value for each input field. The method comprises generating a score for each input field based at least in part on the aggregated aspect field. The method comprises ranking the input fields by their respective scores to identify at least one particular input field in the webform as problematic. The method comprises indicating that the at least one particular input field in the webform is problematic.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 3 illustrates an example webform that may be used in implementing the method of FIG. 2, in accordance with embodiments of the present disclosure.

FIGS. 4A and 4B illustrate example data tables that may be generated in the course of implementing the method of FIG. 2, in accordance with embodiments of the present disclosure.

FIG. 5 illustrates an example data table that may be generated using user data in the course of implementing the method of FIG. 2, in accordance with embodiments of the present disclosure.

FIGS. 6A-6D illustrate example data tables pertaining to input fields in a webform that may be generated using user data in the course of implementing the method of FIG. 2, in accordance with embodiments of the present disclosure.

FIG. 7 illustrates an example data table of a ranking of input fields that may be generated using user data in the course of implementing the method of FIG. 2, in accordance with embodiments of the present disclosure.

FIG. 8 illustrates an example data table of weighted field values and scores that may be generated using user data in the course of implementing the method of FIG. 2, in accordance with embodiments of the present disclosure.

FIG. 9 illustrates an example data table of ranked scores that may be generated using user data in the course of implementing the method of FIG. 2, in accordance with embodiments of the present disclosure.

FIG. 10 illustrates an example report that may be generated using user data in the course of implementing the method of FIG. 2, in accordance with embodiments of the present disclosure.

Figure 1:
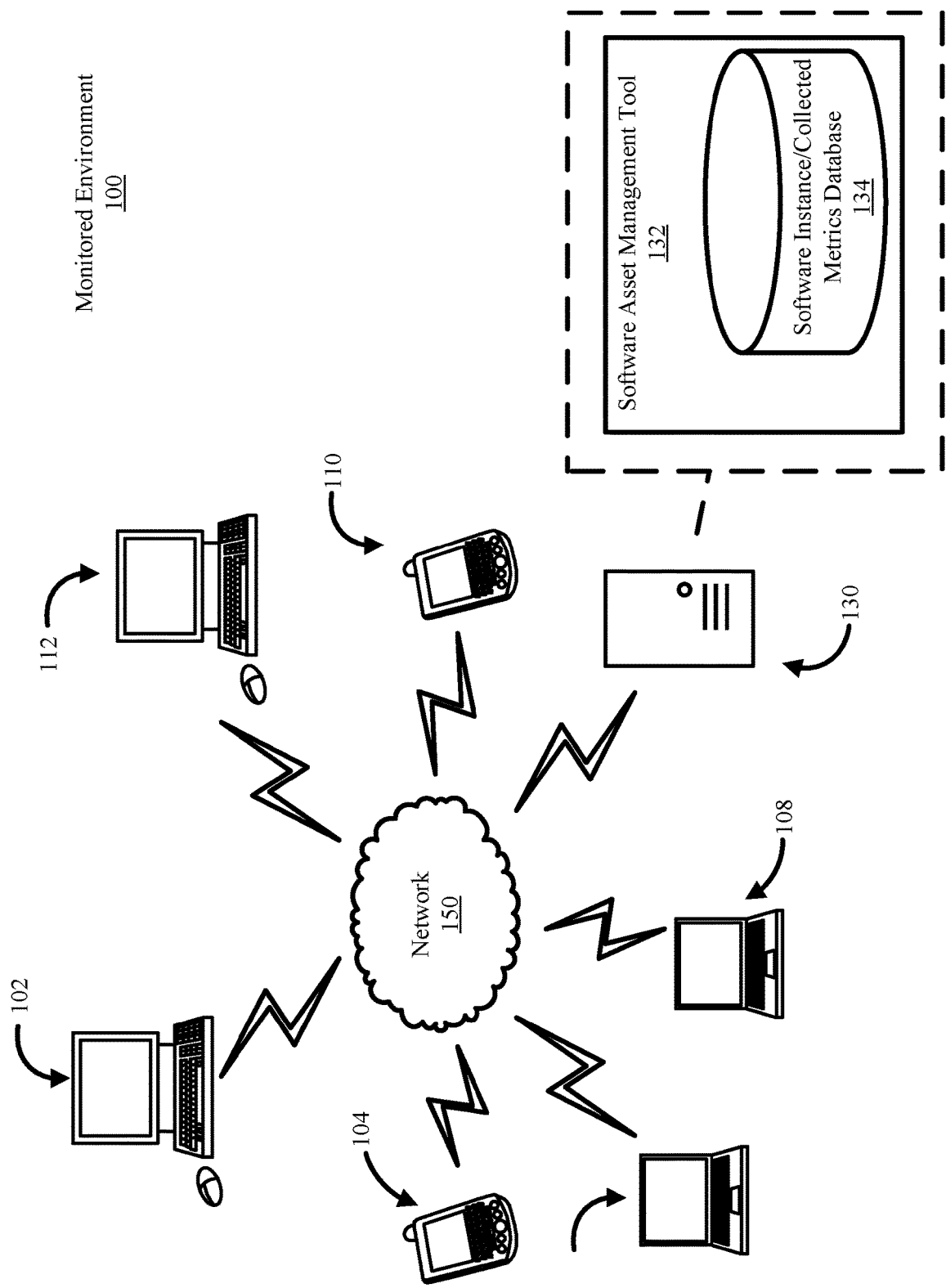
FIG. 1 illustrates a high-level diagram of an example monitored environment, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of webforms, and in particular to identifying problematic input fields in a webform. While the present disclosure is not necessarily limited to such applications, various aspects of the disclosure may be appreciated through a discussion of various examples using this context.

Webforms may be generated by web developers seeking to gather particular information from users who interact with the webforms. Web developers, therefore, desire to generate webforms that accurately gather particular information by clearly and precisely prompting users to provide that particular information. The ease or difficulty of prompting users to provide particular information and predicting the information that users will provide can vary between circumstances. For example, user responses may depend on the context of the webform. Users may be more willing to provide more detailed or personal information to a webform on a website that they know and trust. For example, a user may be more willing to provide an email address in a webform on a website that they have had a positive experience using before. Additionally, users may be more willing to provide more detailed or personal information in a webform if they know that the end-use of their information requires such detail. For example, a user may be more willing to provide their birthday in a webform on a website used to book air travel, because they know that such information is required for booking.

In addition to depending on context, in some cases, user responses to webforms may depend on the structure or wording of the prompt. For example, if a user is filling in a webform to gain access to a new website and is asked for their name, it may not be clear to the user whether to provide a first name, a last name, a full legal name, a nickname, or a username. In some cases, a user may wish to retain privacy by not providing their full name unless required to do so. In such cases, simply prompting a user to provide a name may be more confusing than the web developer expects.

When a user is confused by what information an input field is requiring or requesting and/or does not wish to provide the information that they think is being requested, their issue or problem with the input field may be indicated based on their interactions with the webform. More specifically, a user's interactions with input fields in a webform are defined by at least one aspect. Accordingly, one or more aspects of a user's interactions with input fields of a webform may indicate a problematic input field.

One aspect of user interaction that may indicate a problematic input field is the duration of time users spend active in an input field. The duration of time a user is active in a particular input field may be referred to herein as "Waiting." For example, if a user is unsure whether the input field requires a full legal name or a username, the user may spend longer contemplating the response before entering it into the input field. The longer that users spend waiting in a particular input field, the more likely it is that users find the input field problematic.

Triggers for starting to measure the waiting time for a field may include, for example: movement of focus to the field, for example by clicking on the field, placing the cursor on the field, or otherwise focusing on the field; or focus of the user's eyes on the field (using eye tracking technologies). Triggers for stopping a measurement of the waiting time for a field may include, for example: movement of focus away from the field, for example by moving focus to another field, by clicking, cursor movement, or another way; shifting of the focus of the user's eyes to another field (using eye tracking technologies); or submission of the webform, exiting, or timing-out while the field is in focus.

Another aspect of user interaction that may indicate a problematic input field is deleting or making changes to responses within the input field. Deleting or changing a response in a particular input field may be referred to herein as "Changing." For example, a user may initially enter a full legal name and then delete that response and replace it with a username. The more times that users change responses to an input field, the more likely it is that users find the input field problematic. A mechanism for counting the number of changes made for a particular field can be counting the number of times the user focused on the field. For example, the number of times the user moved the focus from another field to the particular field or moved the initial focus to the particular field, and then typed, copied or otherwise provided a value into the field can be counted.

Another aspect of user interaction that may indicate a problematic input field is entering responses that do not comply with the requirements of a valid entry into the input field. The number of invalid responses that are input into a particular input field may be referred to herein as an invalid response aspect or "Entering an Invalid Response" aspect. For example, a user may enter a username that consists of numbers and lowercase letters. If the webform intended for the user to provide a full legal name, the webform may be programmed to recognize that a name consisting of numbers and lowercase letters is not a full legal name and reject the response as invalid. The more times that users enter invalid responses into an input field, the more likely it is that users find the input field problematic.

Another aspect of user interaction that may indicate a problematic input field is copying the input field, or more specifically, copying the prompt for the input field. The number of times a particular input field or input field prompt is copied may be referred to herein as a copying aspect or "Copying." For example, a user may copy an input field prompt in order to paste the prompt in a web browser to seek more information on what response the prompt is seeking. Accordingly, the more times users copy an input field, the more likely it is that users find the input field problematic.

Another aspect of user interaction that may indicate a problematic input field is closing, moving to another webpage in the browser, timing-out, or exiting the webform while a particular input field is active. Closing a webform while a particular input field is active may be referred to herein as "Exiting." For example, a user may get frustrated by a prompt because they are not sure what response to provide or they may think that the prompt is requesting information that they do not wish to provide. In response, the user may leave the webpage without providing a response to the input field that they find frustrating or confusing. The more times users leave a webpage while a particular input field is active, the more likely it is that users find the input field problematic.

It is to be understood that the above user interaction aspects are provided as illustrative examples of interactions that indicate a user's confusion or frustration with a webform. However, as would be recognized by a person of ordinary skill in the art, other types of interactions may indicate user confusion or frustration, and the present disclosure is not limited to the specific examples disclosed herein.

If users find an input field of a webform problematic, they may enter incorrect information, which interferes with the web developers' ability to gather the desired information. Depending on the end-use of the collected information, such incorrect information may skew results calculated with the collected data. Additionally, or alternatively, incorrect information may result in a negative experience for users, which may hurt the web developers' business and/or ability to collect more data.

Embodiments of the present disclosure may overcome the above, and other, problems by using a method of identifying problematic input fields in a webform. Identifying problematic input fields in a webform enables web developers to focus improvement on those problematic input fields, thereby improving information collection and/or user experience. For example, web developers can clarify, reword, and/or provide different response options for an input field that has been identified as problematic. By knowing which input fields are problematic, web developers can focus time and resources on those specific input fields, thereby improving efficiency and productivity. In other words, by identifying problematic input fields, the methods and systems disclosed herein enable better utilization of web development and the information it collects.

It is to be understood that the aforementioned advantages are example advantages and should not be construed as limiting. Embodiments of the present disclosure can contain all, some, or none of the aforementioned advantages while remaining within the spirit and scope of the present disclosure.

Turning now to the figures, FIG. 1 illustrates a high-level diagram of an example monitored environment 100, in accordance with embodiments of the present disclosure. As noted previously, aspects of the present disclosure relate to identifying problematic input fields in a webform. Accordingly, a better understanding of the present disclosure may be aided by describing an example environment in which such a method may be performed.

The example monitored environment 100 of FIG. 1 includes computers 102, 104, 106, 108, 110, and 112, and a host device 130 of a network 150. Within the monitored environment 100, each of the computers 102-112 may be configured to retrieve, from the host device 130 and over the network 150, a webform. The computers 102-112 may further provide an operating system and graphical user interface (GUI) that allows a user to provide responses to input fields of the webform. The computers 102-112 may further collect information indicative of the user's experience and behaviors while filling out the webform. This information may include, for example, how long a user spends on a given field, how many changes the user makes to his/her answer(s), whether the user stops filling out the webform after reaching a particular field, etc.

In addition, the host device 130 may include an asset administrator 132, also referred to as an asset manager. The asset manager 132 may be configured to receive, from the computers 102-112, the collected information. The asset manager 132 may further store the collected information in a database 134. The asset manager 132 may further process the stored information to identify input fields in the webform that are problematic to users. The asset manager 132 may be configured to perform one or more of the methods described herein, including method 200 of FIG. 2.

It is contemplated that computers 102-112 and host device 130 may be any relevant computer systems or combination of computer systems including, for example, servers, desktops, laptops, mobile phones, smart phones, tablets, personal or enterprise digital assistants, and the like. In some embodiments, each of the computers 102-112 and 130 may be embodied by a computer system/server 1100 described below and shown in FIG. 11. Further, while FIG. 1 illustrates a monitored environment 100 with six computers 102-112 and one host device 130, suitable computing environments for implementing embodiments of this disclosure may include any number of computers and/or host devices. The various models, modules, systems, and components illustrated in FIG. 1 may exist, if at all, across a plurality of host devices and remote devices.

In some embodiments, the network 150 may be implemented by any number of any suitable communications media (e.g., wide area network (WAN), local area network (LAN), Internet, Intranet, etc.). Alternatively, the computers of network 150 may be local to each other and communicate via any appropriate local communication medium (e.g., local area network (LAN), hardwire, wireless link, Intranet, etc.). In some embodiments, the network 150 may be implemented within a cloud computing environment or using one or more cloud computing services. As discussed in more detail below, a cloud computing environment may include a network-based, distributed data processing system that provides one or more cloud computing services.

It is noted that FIG. 1 is intended to depict the representative major components of an example monitored environment 100. In some embodiments, however, individual components may have greater or lesser complexity than as represented in FIG. 1, components other than or in addition to those shown in FIG. 1 may be present, and the number, type, and configuration of such components may vary.

Figure 2:
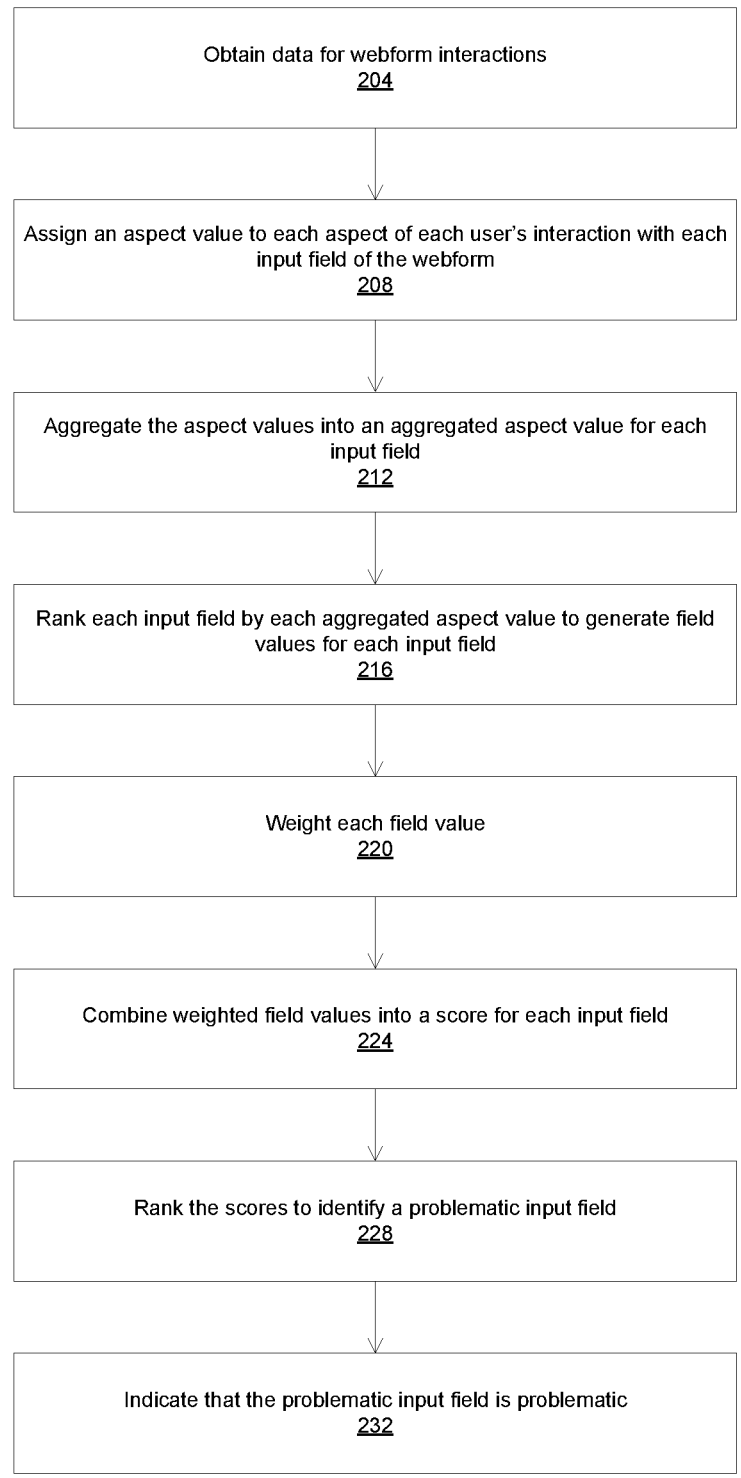
FIG. 2 illustrates a flowchart of an example method for identifying problematic input fields in a webform, in accordance with embodiments of the present disclosure.

Referring now to FIG. 2, illustrated is an example method 200 of identifying problematic input fields in a webform, in accordance with embodiments of the present disclosure. In the illustrated example, the method 200 begins with operation 204, wherein data is obtained for webform interactions. An example webform 300 is shown in FIG. 3. The example webform 300 includes four user input fields 304, 308, 312, and 316, and a submit button 320. In some embodiments of the present disclosure, at operation 204 data may be obtained for any number of user interactions with a webform. In some embodiments of the present disclosure, at operation 204 data may be obtained for a particular number of user interactions with a webform.

Each input field of the webform is made up of at least one interactive graphical user interface element. For example, input fields of the webform can include a text box, a validated text box, a number-input text box, a password-input text box, a radio button, a file select button, a drop-down list, a multi-line entry text box, and a check box. In the example webform 300 shown in FIG. 3, the first input field 304 is a text box, the second input field 308 is a radio button, the third input field 312 is a drop-down list, and the fourth input field 316 is a multi-line entry text box. In alternative embodiments, the webform can include a greater or fewer number of input fields, and each input field can be made up of any interactive graphical user interface element or elements.

FIG. 4A illustrates an example initial input field identification table 400A, which can be used to identify each of the input fields of the webform for organizing and processing the obtained data. As shown in identification table 400A, each input field of the webform is assigned a unique input field identifier, also referred to herein as a Field ID. For example, the initial input field identification table 400A indicates that the first input field 304 ("NAME") in webform 300 of FIG. 3 has been assigned the unique input field identifier Field ID 1. Similarly, the initial input field identification table 400A indicates that the second input field 308 ("SEX") in webform 300 of FIG. 3 has been assigned the unique input field identifier Field ID 2, the third input field 312 ("AGE") has been assigned Field ID 3, and the fourth input field 316 ("EXPERIENCE") has been assigned Field ID 4.

Returning to FIG. 2, in operation 208 of the method 200 aspect values are assigned to each aspect of each user's interaction with each input field of the webform. As discussed above, example aspects of user interactions include waiting, changing, entering an invalid response, copying, and exiting. In the context of the present disclosure, an aspect value is a quantitative value which indicates an extent or degree of the respective aspect.

In order to assign aspect values to each aspect of each user's interaction with each input field of the webform, aspects of the disclosure may identify which input field is focused on during which portions of each user interaction. One way to track a user's focus within a webform is by tracking which input field in a webform is active. In this context, an input field in a webform is active if it is the input field which the user has selected for interaction (e.g., via a cursor on the input field). Another way to track a user's focus within a webform is by collecting eye-tracking data, which indicates where on a user interface a user is directing visual attention. Regardless of how a user's focus is tracked within a webform, such tracking may enable attribution of the user interaction data pertaining to the behaviors and aspects described above to each input field in a webform by attributing data to the field on which the user is focusing at the time the data is collected.

For example, FIG. 5 illustrates an example aspect value table 500, which includes aspect values assigned to each aspect of each user's interaction with each input field of the example webform 300 of FIG. 3. As shown in the aspect value table 500, aspect values were assigned for each of five aspects (Waiting, Changing, Entering an Invalid Response, Copying, and Exiting) for each of four input fields (Field IDs 1-4) for each of four users (Entry IDs 1-4) whose data was collected while interacting with webform 300 of FIG. 3.

As shown, the first row 501 of aspect value table 500 includes data pertaining to interactions of a first user (Entry ID 1) with the first input field (Field ID 1) of the webform 300. As shown, the aspect value assigned to the first user's waiting in the first input field is 10. In this example, the value 10 indicates that the first user waited for 10 seconds, or spent 10 seconds, in the first input field. In some embodiments of the present disclosure, the aspect value for waiting can represent a different unit of time, such as milliseconds. In some embodiments of the present disclosure, the aspect value for waiting can indicate a relationship of the amount of time relative to an expected amount of time or an average amount of time. In such embodiments, relating the aspect to an expected or average amount of time, rather than using raw data, can account for differences in input fields. For example, if an input field prompts the user to provide an open-ended response, the user will likely spend more time waiting/responding than if an input field prompts the user to select between two preset options. This does not necessarily indicate that the open-ended input field is more problematic than the preset option input field, as raw data may misleadingly indicate. Accordingly, scaling the aspect value relative to an expected or average aspect value for each input field may prevent misidentification of an input field as problematic.

The first row 501 of the aspect value table 500 further indicates that the aspect value assigned to the first user's changing in the first input field is 3. In this example, the value 3 indicates that the user changed the response in the first input field three times. In some embodiments of the present disclosure, the aspect value for changing can indicate a relationship of the number of changes relative to an expected number of changes or an average number of changes. As discussed above, scaling the aspect value relative to an expected or average aspect value for each input field may prevent misidentification of an input field as problematic.

The first row 501 of the aspect value table 500 further indicates that the aspect value assigned to the first user's entering an invalid response in the first input field is 2. In this example, the value 2 indicates that the user entered an invalid response in the first input field twice. In some embodiments of the present disclosure, the aspect value for entering an invalid response can indicate a relationship of the number of invalid responses entered relative to an expected number of invalid responses or to an average number of invalid responses. As discussed above, scaling the aspect value relative to an expected or average aspect value for each input field may prevent misidentification of an input field as problematic.

The first row 501 of the aspect value table 500 further indicates that the aspect value assigned to the first user's copying in the first input field is 0. In this example, the value 0 indicates that the user copied the prompt for the first input field zero times. In other words, the user did not copy the prompt for the first input field. In some embodiments of the present disclosure, the aspect value for copying can be a TRUE/FALSE Boolean value and/or TRUE can be represented by the numerical value 1 and FALSE can be represented by the numerical value 0. In some embodiments of the present disclosure, the aspect value for copying can indicate a relationship of the number of times the prompt for an input field was copied relative to an expected number of times or to an average number of times. As discussed above, scaling the aspect value relative to an expected or average aspect value for each input field may prevent misidentification of an input field as problematic.

The first row 501 of the aspect value table 500 further indicates that the aspect value assigned to the first user's exiting the first input field is 0. In this example, the value 0 indicates that the user exited the webform while the first input field was active or focused on zero times. In other words, the user did not exit the webform while the first input field was active or focused on. In some embodiments of the present disclosure, the aspect value for exiting can be a TRUE/FALSE Boolean value and/or TRUE can be represented by the numerical value 1 and FALSE can be represented by the numerical value 0. In some embodiments of the present disclosure, the aspect value for exiting can indicate a relationship of the number of times the user exited from an input field relative to an expected number of times or to an average number of times. As discussed above, scaling the aspect value relative to an expected or average aspect value for each input field may prevent misidentification of an input field as problematic.

Row 502 of the aspect value table 500 indicates an example wherein no data was collected pertaining to the first user's interactions with the second input field of the webform. In other words, row 502 indicates that the first user skipped the second input field of the webform.

In the example embodiment of the present disclosure shown in FIG. 2, operation 208 may be performed subsequently to operation 204. In some alternative embodiments of the present disclosure, the method 200 may proceed by performing operations 204 and 208 simultaneously, or nearly simultaneously. In such embodiments, the data may be obtained for webform interactions and simultaneously, or nearly simultaneously, aspect values may be assigned to each aspect of each user's interaction with each input field of the webform.

In either case, following performance of operations 204 and 208, the method 200 proceeds with operation 212, in which the aspect values are aggregated into aggregated aspect values for each input field. For example, FIGS. 6A-6D illustrate example aggregated aspect value tables 600A, 600B, 600C, and 600D, which include the aspect values assigned to each of input fields 304, 308, 312, and 316 of webform 300 of FIG. 3, respectively. As shown in FIG. 6A, column 601 of aggregated aspect value table 600A includes all of the aspect values assigned to the waiting aspect for the first input field (input field 304). In other words, column 601 includes the assigned waiting aspect values for the first input field for each user who interacted with the first input field. In this case, as shown in FIG. 5, all four users interacted with the first input field. Accordingly, column 601 includes each of their assigned waiting aspect values for the first input field. Similarly, the remaining four columns of aggregated aspect value table 600A include the assigned aspect values for the other four aspects for the first input field.

In substantially the same manner, aggregated aspect value table 600B includes all of the assigned aspect values for the second input field (input field 308), aggregated aspect value table 600C includes all of the assigned aspect values for the third input field (input field 312), and aggregated aspect value table 600D includes all of the assigned aspect values for the fourth input field (input field 316).

Returning to FIG. 6A, the second to bottom row 602 indicates a sum of the aspect values of the column. Accordingly, the value of second to bottom row 602 of each column of aggregated aspect value table 600A indicates a total aspect value pertaining to each aspect value of each input field. The bottom row 603 indicates a mathematic operation that is performed on each total aspect value. In particular, each total aspect value is divided by the number of user interactions with the respective input field. This operation yields an average aspect value pertaining to each aspect value of each input field.

The importance of using the mathematic operation to account for the number of user interactions with the respective input field is to take into consideration when input fields are skipped. For example, in aggregated aspect value table 600B of FIG. 6B, each total aspect value is divided by three user interactions, because, as shown in FIG. 5, the first user skipped the second input field, and therefore no data was collected for aspects of that non-existent interaction. This lack of data for the second input field may cause the second input field to have misleadingly low total aspect values relative to the other input fields simply due to having less data. Accordingly, taking an average for each aspect value of each input field compensates for data that is missing if a user skips an input field.

In some embodiments of the present disclosure, the term "aggregated aspect value" may refer to a total aspect value, such as that indicated in the second to bottom row 602 of aggregated aspect value table 600A. In some embodiments of the present disclosure, the term "aggregated aspect value" may alternatively refer to an averaged aspect value, such as that indicated in the bottom row 603 of aggregated aspect value table 600A. In some embodiments of the present disclosure, the "aggregated aspect value" may be determined using any suitable statistical metric. For example, some embodiments may utilize, without limitation, a mode value, a median value, and/or a range of the individual aspect values. In any case, each input field of the example webform 300 shown in FIG. 3 has five aggregated aspect values, one pertaining to each of the five aspects of user interaction.

Returning to FIG. 2, following performance of operation 212, the method 200 proceeds with operation 216, in which the input fields are ranked by each aggregated aspect value to generate field values for each input field. In other words, these rankings are based on the aggregated aspect values shown in tables 600A-600D of FIGS. 6A-6D. For example, FIG. 7 illustrates an input field ranking table 700 indicating the rankings of each of the four input fields by each of the five aggregated aspect values. As shown in FIG. 7, the first input field (Field ID 1, also referred to as input field 304) has the third highest waiting aggregated aspect value, the second highest changing aggregated aspect value, the highest invalid response aggregated aspect value, the second highest copying aggregated aspect value, and the second highest exiting aggregated aspect value. The results of the ranking are also referred to herein as the field values. For example, the field values for the first input field are 3, 2, 1, 2, and 2.

The importance of ranking each of the input fields by each of their aggregated aspect values is to identify which input field may be problematic according to each individual interaction aspect. However, one particular input field may have a larger waiting aspect value simply because the prompt for the input field is more complex and takes longer to read or because the input field requires a typed text response rather than merely checking provided checkboxes. In such instances, such an input field may have a misleadingly high waiting aggregated aspect value even though the input field is not actually problematic. Accordingly, it is important to take more than one user interaction aspect into consideration. In embodiments of the present disclosure, this may be accomplished by ranking each of the input fields by each of their aggregated aspect values in order to consider multiple aspects of each user's interaction with each input field and achieve a more well-rounded assessment of the input fields.

Returning to FIG. 2, following performance of operation 216, the method 200 proceeds with operation 220, in which the field values for each input field are weighted. For example, FIG. 8 illustrates a weighting table 800 indicating an example weighting factor for the field values for each input field according to each of the five aspect values. As shown in column 801 of FIG. 8, the waiting aspect value is given a weighting factor of 1.0, the changing aspect value is given a weighting factor of 1.4, the invalid response aspect value is given a weighting factor of 1.2, the copying aspect value is given a weighting factor of 1.6, and the exiting aspect value is given a weighting factor of 2.0.

In alternative embodiments of the present disclosure, each of these weighting factors can be different than in the provided example. Furthermore, in some embodiments of the present disclosure, more than one aspect value can have the same weighting factor. In any case, weightings are specifically assigned to each aspect value according to the relative importance of each aspect value in indicating how problematic an input field is. For example, in some embodiments, an input field which results in users exiting the webform is likely the most problematic input field of the webform. Accordingly, the exiting aspect value is given the greatest weighting relative to the other aspect values. In the present example, according to the weightings provided in column 801 of FIG. 8, exiting is the most important aspect and waiting is the least important aspect. In other words, exiting is considered most strongly and waiting is considered least strongly when determining which input field in the webform is most problematic.

In weighting table 800, the rows indicated by each of the aspect values include the field values for each of the input fields weighted according to the corresponding aspect value weighting. More specifically, as shown for the waiting aspect of the first input field (Field 1), the field value (3) is subtracted from the total number of input fields (4) such that the value directly correlates to the level of importance rather than to the numerical value of the ranking. More specifically, in this example, because there are four input fields and the first input field is ranked third in the waiting aspect, the numerical value of the ranking (3) is subtracted from the number of input fields (4), resulting in a value of 1. This value is then multiplied by the weighting for the waiting aspect, which is 1.0, to provide a weighted field value of 1.0 for the first input field. These operations are repeated for each input field for each aspect value as illustrated in weighting table 800. Accordingly, five weighted field values are generated for each input field, one pertaining to each aspect.

Returning to FIG. 2, following performance of operation 220, wherein each field value is weighted, the method 200 proceeds with operation 224, wherein the weighted field values are combined into a score for each input field. As shown in row 802 of weighting table 800 in FIG. 8, the weighted field values are added together for each input field to generate a score for each input field.

Following performance of operation 224, the method 200 proceeds with operation 228, wherein the scores of the input fields are ranked to identify a problematic input field. For example, FIG. 9 illustrates an example score ranking table 900, which compares the scores (generated by weighting table 800) for each of the input fields to rank the input fields by score. As shown in score ranking table 900, the highest score (19.4) was earned by input field 4. Accordingly, input field 4 was ranked first, which indicates that input field 316 was the most problematic input field on the webform 300 (shown in FIG. 3).

In some embodiments of the present disclosure, the score of an input field may be used to determine that the input field is problematic using any suitable statistical metric. For example, in some embodiments, without limitation, an input field may be indicated as being problematic if it meets a predetermined threshold. For example, if the score of an input field meets a predetermined score threshold, then the input field is indicated as being problematic. Such embodiments account for webforms wherein all of the input fields are problematic (if all scores meet the predetermined score threshold) or none of the input fields are problematic (if no scores meet the predetermined score threshold). In some alternative embodiments, without limitation, an input field may be indicated as being problematic if the score for the input field is outside one standard deviation of the mean score.

Finally, following performance of operation 228, the method 200 proceeds with operation 232, wherein it is indicated that the problematic input field is problematic. For example, FIG. 10 illustrates an example report 1000 which can be displayed to the web developers. In the example shown in FIG. 10, the report 1000 merely includes the end results of the method 200. In particular, in a field indicating the most problematic input field, the report 1000 displays the result 4, which is the identification of the input field with the highest ranking from score ranking table 900. In a field indicating the second most problematic input field, the report 1000 displays the result 1, which is the identification of the input field with the second highest ranking from score ranking table 900.

In the embodiment shown, the report 1000 displays results for every one of the input fields of the webform 300. In alternative embodiments, the report 1000 may display a certain number of results. For example, the report 1000 may display the top three most problematic input fields. In other alternative embodiments, the report 1000 may display results for a specific proportion of input fields. For example, the report 1000 may display results for the most problematic 50% of input fields. In some embodiments of the present disclosure, the number or proportion of results shown may be selected by the web developers.

In the embodiment shown, the report 1000 displays only the final ranking of the input fields. In alternative embodiments, the report 1000 may display any or all of the information shown in tables 500-900 in FIGS. 5-9 to provide differing levels of detail of the operations performed by method 200. In some embodiments of the present disclosure, the amount of information or the level of detail provided in the report may be selected by the web developers.

In some embodiments, the data from the report 1000 (and/or from any of the tables discussed herein) may be displayed on a copy of the webform. For example, annotations may be added to the webform such that when the developer hovers over a section of the webform (e.g., over a field name), the information pertaining to that field is displayed. Additionally, any input field that is identified as problematic (e.g., has a score that exceeds a threshold) may be highlighted or otherwise identified. A suggested change for the problematic input fields may also be included in the annotations. This may allow a web developer to quickly and intuitively evaluate a webform, determine which input fields to change, and determine how they should be changed.

In response to the report 1000, the web developers may modify the prompts for input fields 4 and 1 (input fields 316 and 304 in webform 300 of FIG. 3), which were indicated as being the most problematic input fields. For example, in input field 316 of webform 300, the web developers may clarify that "EXPERIENCE" is intended to refer to "PREVIOUS RELATED EXPERIENCE." Similarly, in input field 304 of webform 300, the web developers may clarify that "NAME" is intended to refer to "FULL NAME."

As indicated in FIG. 4B, which illustrates an example subsequent input field identification table 400B, replacing the input field prompt of the input field 304 with "FULL NAME" results in assigning a new unique input field identifier Field ID 6 to updated input field 304. Similarly, replacing the input field prompt of the input field 316 with "PREVIOUS RELATED EXPERIENCE" results in assigning a new unique input field identifier Field ID 7 to updated input field 316. In this way, data collected for updated input field prompts can be compared to previous data collected for the replaced input field prompts for the same input field to determine whether updating the input field prompt had the desired effect of improving the clarity of the input field, therefore improving the resulting information collected from the webform 300.

In some embodiments of the present disclosure, in addition to, or instead of, identifying the problematic input fields to web developers, the computer can analyze the identified problematic input field and potential acceptable alternatives. For example, if the problematic input field in a road race registration form is asking users to select a "group," and the dropdown menu provides a list of age ranges, the computer may discern that the input field is intending to gather information regarding users' age group for determining a runner's place in the road race. The computer may discern this by comparing the webform type, input field prompt, and selection options with those of other webforms. The computer may then compare the problematic input field prompt with those intending to gather the same information that were not found to be problematic. The computer may then recommend replacing the problematic input field prompt with the prompt that was not found to be problematic. Alternatively, the computer may make the replacement automatically.

Figure 11:
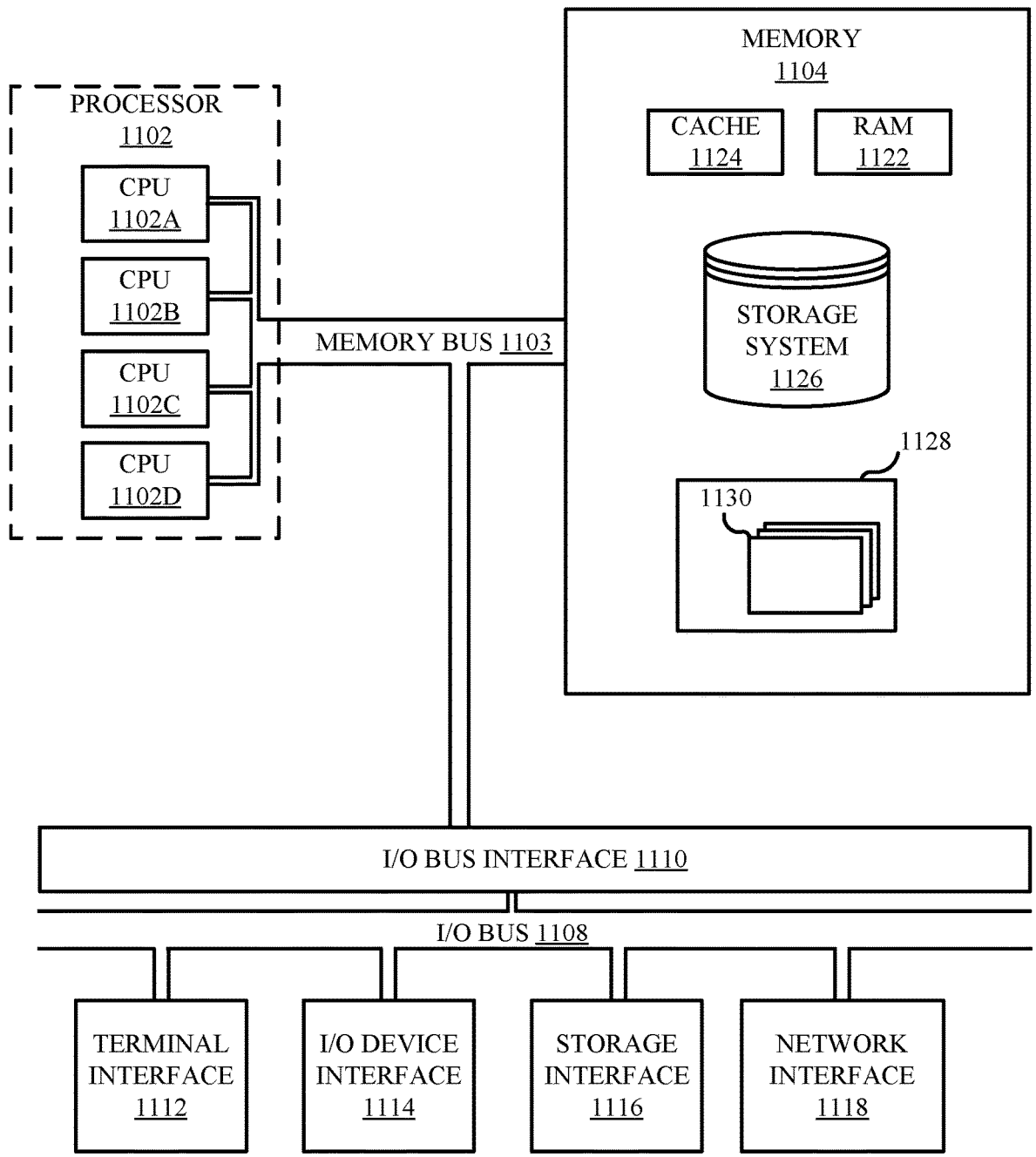
FIG. 11 illustrates a high-level block diagram of an example computer system that may be used in implementing one or more of the methods, tools, and modules, and any related functions, described herein, in accordance with embodiments of the present disclosure.

Referring now to FIG. 11, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface unit 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache.

System memory 1104 may include computer system readable media in the form of volatile memory, such as random access memory (RAM) 1122 or cache memory 1124. Computer system 1101 may further include other removable/non-removable, volatile/non-volatile computer system storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 1104 can include flash memory, e.g., a flash memory stick drive or a flash drive. Memory devices can be connected to memory bus 1103 by one or more data media interfaces. The memory 1104 may include at least one program product having a set (e.g., at least one) of program modules that are configured to carry out the functions of various embodiments.

One or more programs/utilities 1128, each having at least one set of program modules 1130 may be stored in memory 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 1130 generally perform the functions or methodologies of various embodiments.

Although the memory bus 1103 is shown in FIG. 11 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single respective units, the computer system 1101 may, in some embodiments, contain multiple I/O bus interface units 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 11 is intended to depict the representative major components of an exemplary computer system 1101. In some embodiments, however, individual components may have greater or lesser complexity than as represented in FIG. 11, components other than or in addition to those shown in FIG. 11 may be present, and the number, type, and configuration of such components may vary.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 12:
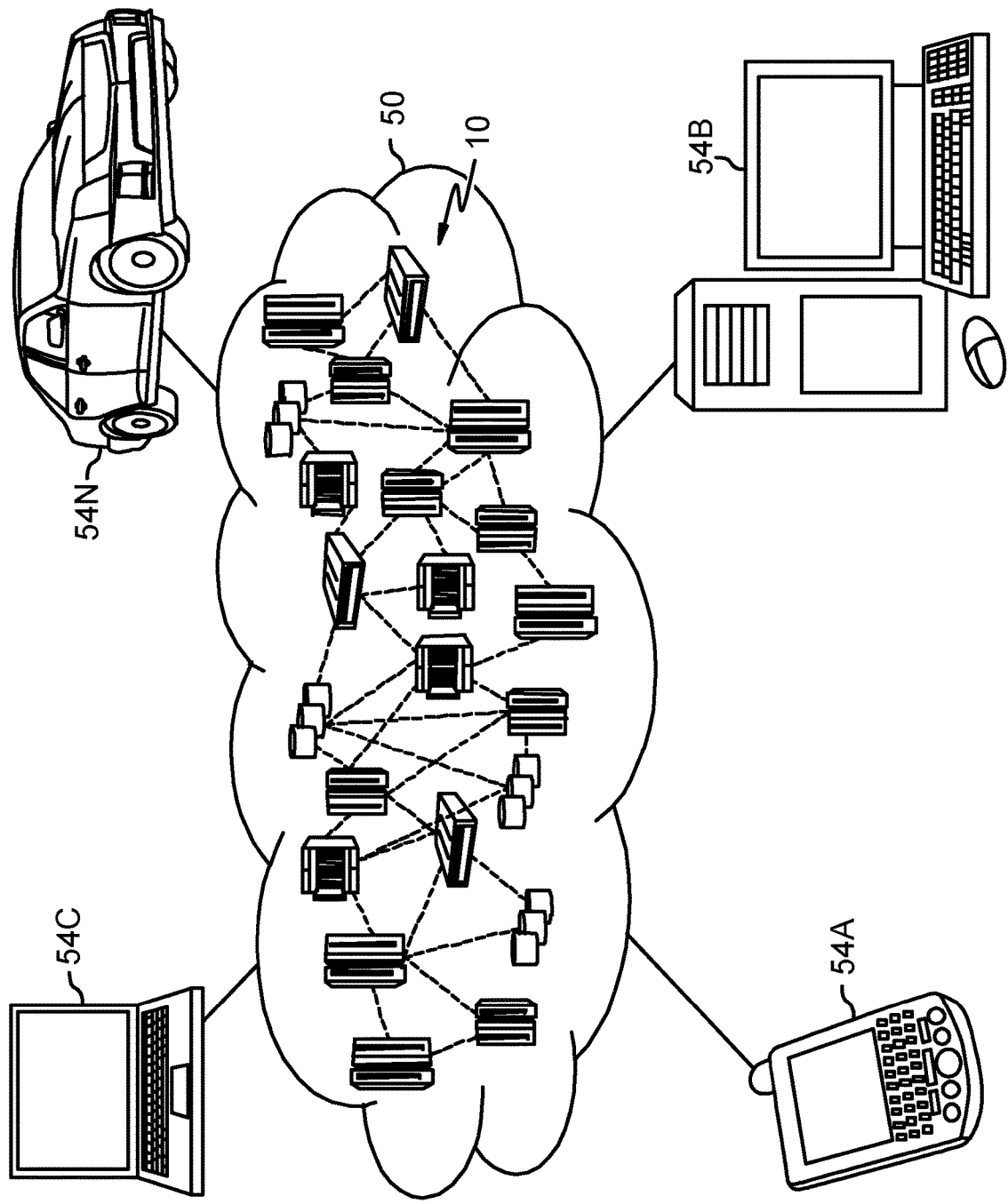
FIG. 12 depicts a cloud computing environment, in accordance with embodiments of the present disclosure.

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
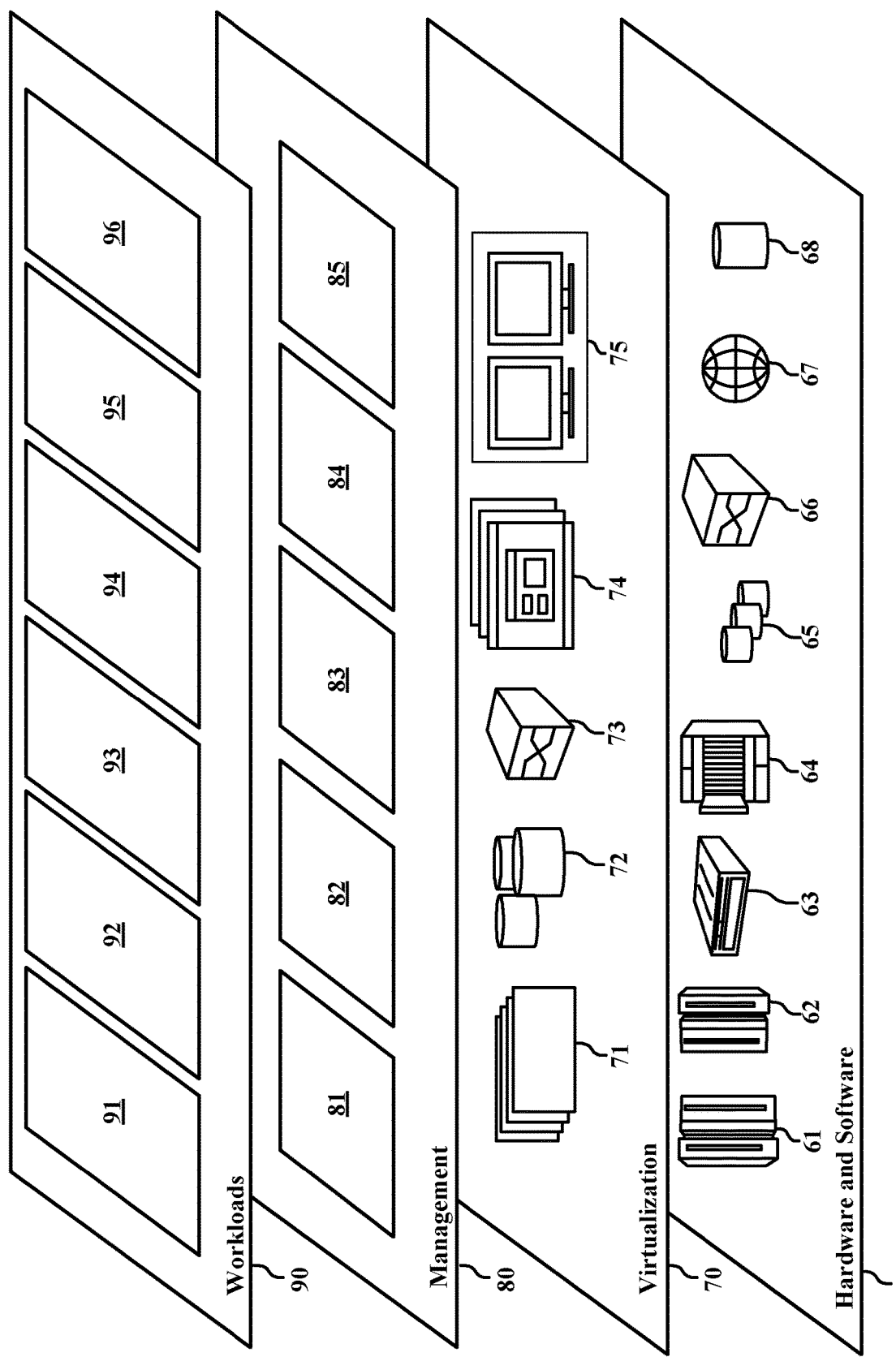
FIG. 13 depicts abstraction model layers, in accordance with embodiments of the present disclosure.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

In addition to embodiments described above, other embodiments having fewer operational steps, more operational steps, or different operational steps are contemplated. Also, some embodiments may perform some or all of the above operational steps in a different order. Furthermore, multiple operations may occur at the same time or as an internal part of a larger process. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method comprising:
    obtaining a set of user interaction data for a plurality of user interactions with input fields of a webform, wherein the user interaction data for each input field includes data corresponding to at least one aspect;
    assigning a respective aspect value to each aspect of each user interaction with each input field, wherein the aspect value correlates to user hesitancy regarding the input field;
    aggregating the aspect values into an aggregated aspect value for each input field;
    generating a score for each input field based at least in part on the aggregated aspect value;
    comparing the scores for each of the input fields to identify an order ranking the input fields such that a particular input field which is ranked first is identified as most problematic in terms of user hesitancy;
    indicating that the particular input field is most problematic in terms of user hesitancy; and
    replacing an input field prompt of the most problematic input field with an updated input field prompt, wherein the updated input field prompt is assigned a different input field identifier than the input field prompt of the most problematic input field.

2. The method of claim 1, wherein generating a score for each input field includes:
    ranking the input fields by each aggregated aspect value to generate field values for each input field;
    weighting the field values for each input field; and
    combining the weighted field values for each input field into the score for each input field.

3. The method of claim 1, wherein the at least one aspect is selected from a group consisting of: a duration of time active in a particular input field; a number of changes in a particular input field; a number of invalid inputs in a particular input field; a number of times the webform is closed, moved from, times-out, or exited while a particular input field is active; and a number of times a particular input field is copied.

4. The method of claim 3, wherein aggregating the aspect values includes dividing the aspect value for each input field by a number of user interactions with the respective input field.

5. The method of claim 1, wherein assigning the respective aspect value to each aspect of each user interaction with each input field includes relating each aspect to a respective expected aspect value.

6. The method of claim 1, wherein assigning the respective aspect value to each aspect of each user interaction with each input field includes relating each aspect to a respective average aspect value.

7. The method of claim 1, further comprising:
providing a suggested change to be made to an input field prompt of the most problematic input field to improve user hesitancy regarding the most problematic input field.

8. A computer program product comprising a computer readable storage medium having program instructions embodied therewith, the program instructions executable by a processor to cause the processor to perform a method comprising:
obtaining a set of user interaction data for a plurality of user interactions with input fields of a webform, wherein the user interaction data for each input field includes data corresponding to at least one aspect;
assigning a respective aspect value to each aspect of each user interaction with each input field, wherein the aspect value correlates to user hesitancy regarding the input field;
aggregating the aspect values into an aggregated aspect value for each input field;
generating a score for each input field based at least in part on the aggregated aspect value;
comparing the scores for each of the input fields to identify an order ranking the input fields such that a particular input field which is ranked first is identified as most problematic in terms of user hesitancy;
indicating that the particular input field is most problematic in terms of user hesitancy; and
replacing an input field prompt of the most problematic input field with an updated input field prompt, wherein the updated input field prompt is assigned a different input field identifier than the input field prompt of the most problematic input field.

9. The computer program product of claim 8, wherein generating a score for each input field includes:
ranking the input fields by each aggregated aspect value to generate field values for each input field;
weighting the field values for each input field; and
combining the weighted field values for each input field into the score for each input field.

10. The computer program product of claim 8, wherein aggregating the aspect values includes dividing the aspect value for each input field by a number of user interactions with the respective input field.

11. The computer program product of claim 8, wherein assigning the respective aspect value to each aspect of each user interaction with each input field includes relating each aspect to a respective expected aspect value.

12. The computer program product of claim 8, wherein assigning the respective aspect value to each aspect of each user interaction with each input field includes relating each aspect to a respective average aspect value.

13. A system for identifying a problematic input field in a webform, the system comprising:
a memory; and
a processor communicatively coupled to the memory, wherein the processor is configured to perform a method comprising:
obtaining a set of user interaction data for a plurality of user interactions with input fields of a webform, wherein the user interaction data for each input field includes data corresponding to at least one aspect;
assigning a respective aspect value to each aspect of each user interaction with each input field, wherein the aspect value correlates to user hesitancy regarding the input field;
aggregating the aspect values into an aggregated aspect value for each input field;
generating a score for each input field based at least in part on the aggregated aspect value;
comparing the scores for each of the input fields to identify an order ranking the input fields such that a particular input field which is ranked first is identified as most problematic in terms of user hesitancy;
indicating that the particular input field is most problematic in terms of user hesitancy; and
replacing an input field prompt of the most problematic input field with an updated input field prompt, wherein the updated input field prompt is assigned a different input field identifier than the input field prompt of the most problematic input field.

14. The system of claim 13, wherein generating a score for each input field includes:
ranking the input fields by each aggregated aspect value to generate field values for each input field;
weighting the field values for each input field; and
combining the weighted field values for each input field into the score for each input field.

15. The system of claim 13, wherein aggregating the aspect values includes dividing the aspect value for each input field by a number of user interactions with the respective input field.

16. The system of claim 13, wherein assigning the respective aspect value to each aspect of each user interaction with each input field includes relating each aspect to a respective expected aspect value.

17. The system of claim 13, wherein:
the method includes analyzing user hesitancy regarding input field prompts of the webform, and analyzing user hesitancy includes:
obtaining the set of user interaction data;
assigning the respective aspect value to each aspect;
aggregating the aspect values;
generating the score for each input field; and
comparing the scores.

* * * * *